United States Patent [19]

Elkins et al.

[11] Patent Number: 5,859,888
[45] Date of Patent: Jan. 12, 1999

[54] PART LENGTH FUEL ROD EXTENSION

[75] Inventors: Robert B. Elkins, Wilmington; Harold B. King, Wrightsville Beach, both of N.C.

[73] Assignee: General Electric Company, Schenectady, N.Y.

[21] Appl. No.: 852,298

[22] Filed: May 7, 1997

[51] Int. Cl.[6] .................................................. G21C 3/322
[52] U.S. Cl. ........................................... 376/443; 376/444
[58] Field of Search .................................. 376/209, 435, 376/443, 444, 446

[56] References Cited

U.S. PATENT DOCUMENTS

| | | |
|---|---|---|
| 4,089,742 | 5/1978 | Amaral et al. ............................ 376/444 |
| 5,017,332 | 5/1991 | Dix et al. ................................. 376/444 |
| 5,091,146 | 2/1992 | Dix .......................................... 376/443 |
| 5,112,570 | 5/1992 | Dix et al. ................................. 376/435 |
| 5,416,812 | 5/1995 | Matzner ................................... 376/443 |
| 5,491,733 | 2/1996 | Patterson et al. ........................ 376/443 |
| 5,598,450 | 1/1997 | Proebstle et al. ........................ 376/444 |
| 5,668,728 | 9/1997 | Dix et al. ................................. 376/443 |

Primary Examiner—Daniel D. Wasil
Attorney, Agent, or Firm—Nixon & Vanderhye P.C.

[57] ABSTRACT

In a fuel bundle for a boiling water nuclear reactor comprising a plurality of fuel rods secured within an array and extending between upper and lower tie plates, and including at least one additional fuel rod extending from the lower tie plate but terminating short of the upper tie plate, an improvement wherein a removable extension rod secured to the at least one additional fuel rod and extending substantially to the upper tie plate. The removable extension rod is in the form of a hollow tube having a plurality of openings therein and an internal flow path over an axial portion of the hollow tube, the flow path serving to cause coolant in the hollow tube to be deposited on adjacent fuel rods.

11 Claims, 2 Drawing Sheets

PART LENGTH FUEL ROD EXTENSION

TECHNICAL FIELD

This invention relates to fuel bundles for use in boiling water nuclear reactors. More specifically, the invention relates to fuel bundles which utilize partial length fuel rods extending from the bottom of the assembly to the regions of the fuel assembly in which two phase steam-water flow occurs. In accordance with this invention, part length fuel rod extensions are provided which impart a swirling action on the two phase coolant which will redeposit water droplets onto adjacent fuel rods.

BACKGROUND PRIOR ART

Modern boiling water nuclear reactors (BWR's) include in the core region of the reactor a core bypass volume and a fuel channel volume. The fuel channel volume includes bundles of elongated rods or cladding containing the reacting fuel. These bundles are placed within surrounding channels between lower and upper tie plates, and held in a predetermined array by spacers located axially along the bundles. In many such fuel bundle designs, one or more hollow tubes or "water rods" are also positioned in the bundle to provide an additional volume of moderating water. The core bypass volume is exterior of the channels. It is the region in which the control rods control the nuclear reaction and includes additional water moderator for efficient reaction.

Current fuel bundle design has been limited by the need to operate below thermal limits and avoid thermal hydraulic instabilities and coupled nuclear-thermal-hydraulic reactor core instabilities. The stability limits affect the degree to which the fuel assembly can be optimized for minimum fuel cycle costs.

For BWR's having discrete bundles of fuel rods confined within channel enclosed fuel assemblies, improved bundles are disclosed in commonly owned U.S. Pat. Nos. 5,017,332; 5,112,570; and 5,416,812. In accordance with the disclosures in these patents, partial length rods (PLR's) are utilized which extend upwardly from the bottom of the channel (within the boiling region), but only part way to the top of the channel. In other words, these PLR's are axially shortened with respect to the remaining full length rods (FLR's) and are distributed throughout the fuel bundle, with the preferred disposition being in the interior of the bundle, away from the channel walls. The PLR's terminate at a selected spacer located in the two phase flow region of the fuel bundle assembly. Not all PLR's need be of the same length however. For example, some may terminate at one spacer, while others terminate at another spacer, upstream or downstream of the one spacer. Preferably, the length of PLR's is at least one-half of the total height of the fuel bundle.

In commonly owned co-pending U.S. application Ser. No. 08/624,032, filed Nov. 23, 1994, now U.S. Pat. No. 5,598,450, unfueled followers or fuel rod extensions are attached to the tops of the partial length fuel rods so that, geometrically, they behave like the higher flow resistance FLR's.

In those instances where the space above the PLR's has been left vacant to facilitate removal of the PLR's and to provide a free volume so as to allow two phase mixture to bypass fuel rods and spacers and thus reduce two phase pressure drop, "swirlers" have been attached to the fuel bundle spacers for the purpose of redepositing the water droplets in the partial length bypass flow back onto adjacent fuel rods. This configuration, however, still does not allow field removal of the PLR's.

Swirlers have also been disclosed in conjunction with steam vents. Here again, however, PLR's cannot be removed in the field, and the swirlers per se are not only difficult to manufacture, but are difficult to attach to the fuel bundle spacers.

Accordingly, there remains a need for an arrangement which achieves a swirl effect above PLR's in a cost-effective way, and which also allows for field removal of the PLR's.

DISCLOSURE OF THE INVENTION

The principal object of this invention is to use centrifugal forces to redeposit water droplets in regions above PLR's onto the adjacent fuel rods and at the same time, allow the PLR's to be removed in the field. Another objective is to provide a coolant swirling mechanism which is not only easy to manufacture, but which is also resistant to flow induced vibrations.

In the exemplary embodiment of the invention, there is provided a Zircaloy PLR extension tube, of approximately the same diameter as the fuel bundle spacer ferrule tubing, attached to the upper end plug of the PLR by welding, and closed at its upper end by a plug with features similar to a PLR upper end plug, to facilitate grappling for removal. The PLR extension tubes in accordance with this invention have three significant structural features:

(1) Two series of helically oriented tabs are cut into the tube and bent inwardly to, in effect, create a twisted ribbon interiorly of the tube adjacent the resultant helical or spiral "windows" to facilitate the removal of heavier water droplets. This structural feature is preferably located anywhere axially between a pair of adjacent fuel bundle spacers to replenish the liquid film on adjacent fuel rods and thus maximize the benefit of the PLR extensions;

(2) A plurality of smaller holes or apertures are formed in the hollow PLR extension in order to insure that the tube is well ventilated; and (3) Two pair of axial slits are formed in the tube, in axial alignment with fuel bundle spacer locations, and circumferentially aligned with spacer ferrule locations. The material between each pair of slits is deformed slightly outwardly to create an interference fit with the spacer ferrules at spacer locations when installed.

Preferably, the PLR tube extensions in accordance with this invention are attached to all of the PLR's in the fuel bundle and extend upwardly through the top 2–4 spacers.

In an alternative arrangement, a discrete twisted ribbon-like metal insert may be located within a hollow PLR extension tube, with helical windows located adjacent the ribbon. The twisted ribbon is welded in place to create substantially the same geometry as described hereinabove with respect to the bent tab arrangement.

In accordance with its broader aspects, therefore, there is provided a fuel bundle for a boiling water nuclear reactor comprising a plurality of fuel rods secured within an array and extending between upper and lower tie plates, and including at least one additional fuel rod extending from the lower tie plate but terminating short of the upper tie plate, the improvement comprising a removable extension rod secured to the at least one additional fuel rod and extending substantially to the upper tie plate, the removable extension rod comprising a hollow tube having a plurality of openings therein and an internal flow path over an axial portion of the hollow tube, the flow path serving to cause coolant in the hollow tube to be deposited on adjacent fuel rods.

In another aspect, the invention relates to a partial length fuel rod extender adapted to be attached to an upper end of a partial length fuel rod of a nuclear reactor fuel bundle comprising a hollow tube having a plurality of openings therein and an internal flow path over an axial portion of the hollow tube, the flow path shaped to deposit coolant flowing in the hollow tube onto adjacent fuel rods.

Other objects and advantages of the subject invention will become apparent from the detailed description which follows.

BEST MODE FOR CARRYING OUT THE INVENTION

Figure 1:
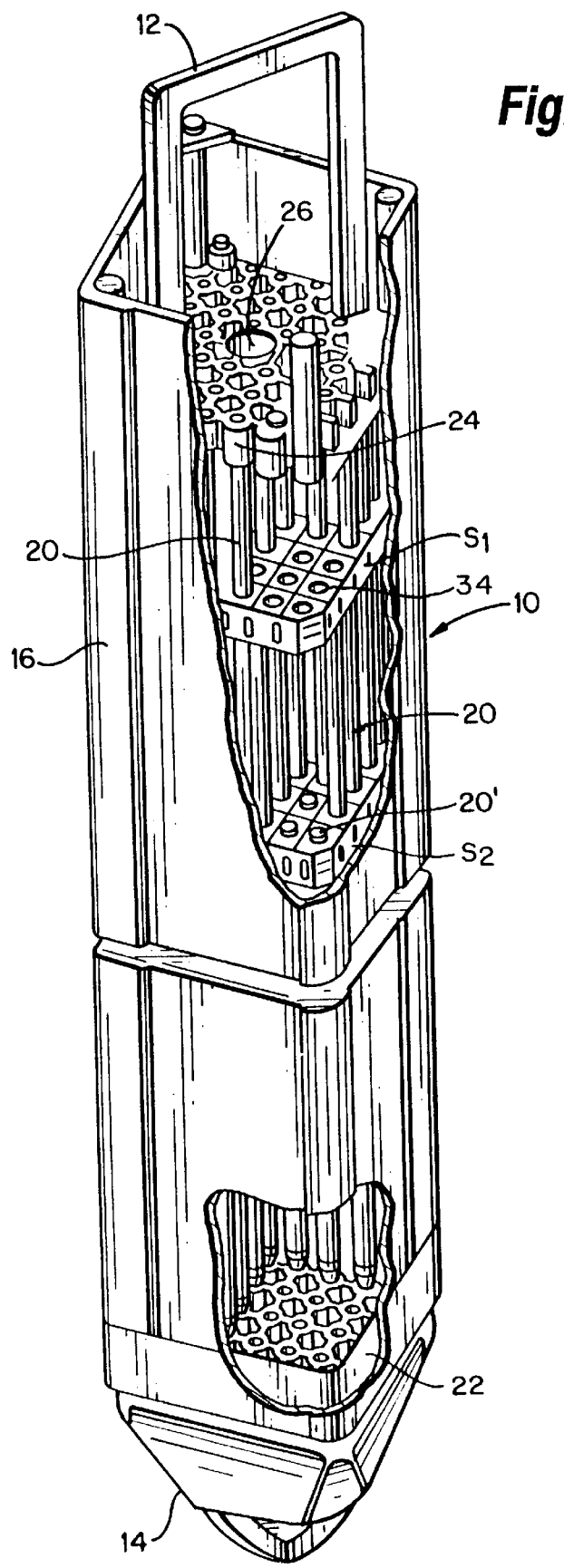
FIG. 1 is a perspective view, partially cut away, illustrating a known fuel bundle assembly.

With reference now to FIG. 1, a conventional fuel bundle assembly is shown at 10. It will be understood that the fuel bundle assembly is not shown in its true length, but instead is broken away so as to illustrate the bottom and top portions of the bundle only. The assembly includes an upper handle 12 and a lower nose piece 14. A channel 16 extends upwardly from the nose piece end substantially the full length of the fuel bundle assembly 10. Individual fuel rods 20 are disposed in a matrix interior of the fuel assembly, i.e., surrounded by the channel 16. The full length fuel rods (FLR's) 20 extend between a lower tie plate 22 and an upper tie plate 24 in a well known manner, whereas partial length fuel rods (PLR's) 20' extend upwardly from the lower tie plate 22 but terminate short of the upper tie plate 24 as explained in greater detail below.

The rods 20 (including PLR's 20') are normally arrayed in rows and columns. Further, and because of the length of the fuel assemblies (on the order of 160 inches), spacers, e.g., $S_1, S_2 \ldots S_N$ are placed along the length of the fuel assembly to retain the fuel rods in the desired array and to minimize or eliminate lateral vibration of the fuel rods. Typically, seven such spacers, roughly evenly spaced at 20 inch intervals, extend from the top to the bottom of the fuel assembly.

The fuel rods 20 are generally arranged in a square (9×9, 10×10, etc.) matrix or array. A water rod 26 is shown in the middle of the array, also extending between the upper and lower tie plates 24 and 22.

The invention here relates to a modification of the PLR's 20' which usually extend at least one-half of the length of the fuel assembly. As already noted, the PLR's 20' extend from the bottom tie plate 22 and extend upwardly toward the upper tie plate 24. The PLR's terminate short of the upper tie plate 24, however, preferably just above an adjacent spacer, e.g., $S_2$ as shown in FIG. 1. For purposes of this invention, however, it is not important where the PLR's terminate, although PLR's will typically extend upwardly at least into the upper two phase region of the bundle. The invention here is also not limited to any particular location for the PLR's within the array of fuel rods.

Figure 2:
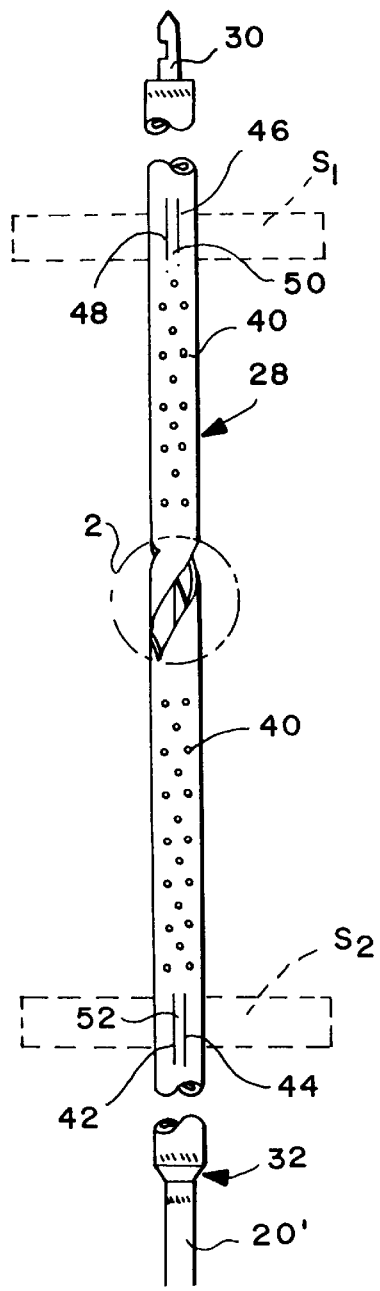
FIG. 2 is a partial side elevation of a fuel bundle water rod in accordance with this invention.
Figure 3:
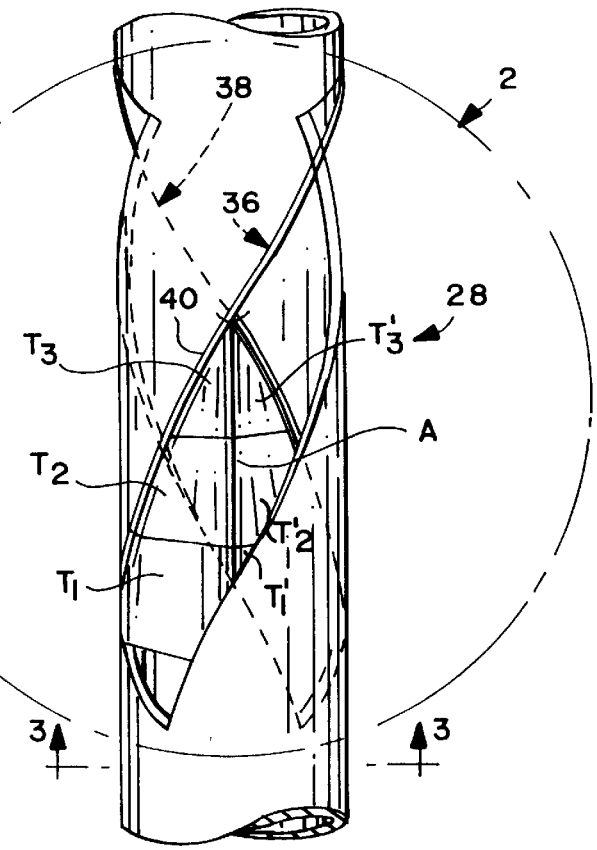
FIG. 3 is an enlarged detail taken from FIG. 1.
Figure 4:
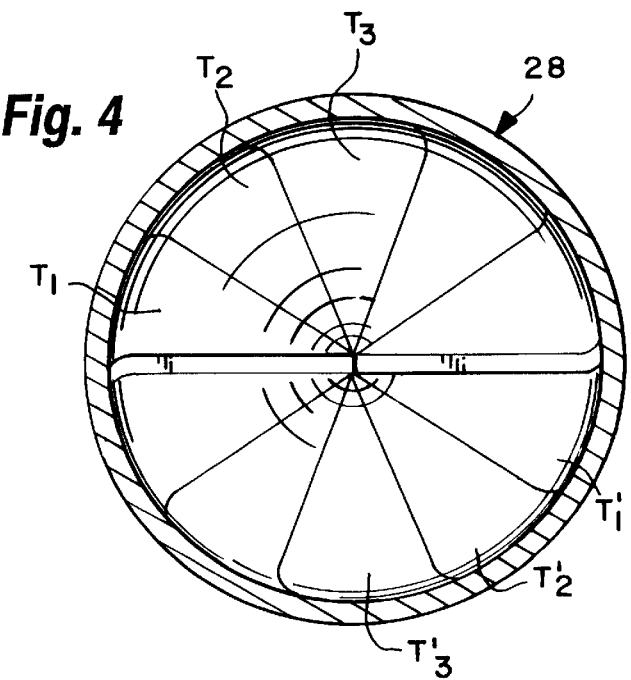
FIG. 4 is a section along the line 3—3 of FIG. 1.

With reference now to FIG. 2, a removable, unfueled extension rod 28 is secured to the upper end of a PLR 20', extending upwardly through a pair of adjacent spacers $S_1$ and $S_2$ to or at least near the upper tie plate 24 (not shown in FIG. 2). A similar follower or extension would be installed for each PLR 20' in the bundle. Each extension rod 28 is provided with an otherwise conventional end plug 30 which facilitates attachment to the upper tie plate and/or attachment to a grappling tool for removal of the PLR from the bundle.

The follower or extension rod 28 may be secured to the uppermost ends (e.g., the end plugs) of the PLR's 20' at a joint 32 by any suitable fastening means such as a bayonet joint, screw threads or the like. The follower or extension rod 28 is, in accordance with this invention, tubular in form. More specifically, the unfueled extension rod comprises a Zircaloy tube which has a diameter approximately the size of a fuel bundle spacer ferrule 34 (FIG. 1), attached to the upper end plug of the partial length fuel rod by welding or other suitable means.

In the exemplary embodiment, the PLR extension rod or tube 28 is formed with a pair of helical "windows" 36, 38 which are located in diametrically opposed relationship to each other, and in mirror image form as indicated in FIG. 2. To form the helical or spiral "windows", a series of tabs $T_1$, $T_2, T_3 \ldots T_n$ are cut in the tube 28 and then bent inwardly along the spiral line 40, until the free end portions of each tab lie substantially along the longitudinal axis A of the tube. With similar tabs $T_1', T_2', T_3' \ldots T_n'$ cut and bent in the same fashion in the diametrically opposed spiral "window" 38, the effect is to provide an interior twisted ribbon within the tube. Looking upwardly into the tube 28, the projected area of the bent tabs $T_1, T_2, \ldots T_n$ substantially block the cross section of the tube 32, thus forcing the two phase mixture in an upward circular motion of at least 180°. The tabs in each window 36, 38 overlap increasingly near the center line of the tube 28 because the original helical developed length of the tab ends are, of course, longer than the associated axial center line length. Thus, the tabs are necessarily sequentially formed to achieve the desired effect. The "windows" 36, 38 which result from the tab bending also facilitate removal of the heavier water droplets, and also minimize pressure drop. Because the tabs are all located interiorly of the tube 38, there is no impediment to quick and easy removal of the PLR's from the bundle.

Another feature in accordance with this invention relates to a plurality of relatively small round holes or apertures 40 formed within the periphery of the tube 32 above and below the helical "windows" 36, 38. These openings are provided simply to insure good ventilation of the tube.

Finally, two pair of axial slits 42, 44 and 46, 48 are provided in the tube 28 at axially spaced locations, corresponding to the location of the fuel bundle spacers. The metal tubing material between each pair of axially extending slits (as indicated by numerals 50, 52) is deformed slightly radially outwardly, in order to insure an interference fit with spacer ferrules in the spaces $S_1$ and $S_2$.

In the preferred arrangement, the PLR extension tube 28 as described hereinabove extends axially through the top 2–4 fuel bundle spacers, and a tube 28 is secured to each of the PLR's in the bundle.

In an alternative embodiment, the helical "windows" 36, 38 may be cut into the peripheral wall of the tube with the cut material removed. A twisted ribbon (not shown) could then be inserted and fixed within the tube between the helical "windows" and welded in place to create substantially the same geometry as described above.

The PLR extension tubes 28 as described above achieve the desired swirling effect above partial length rods in a cost-effective way which also allows for relatively simple removal of the partial length fuel rods in the field.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel bundle for a boiling water nuclear reactor comprising a plurality of fuel rods secured within an array and extending between upper and lower tie plates, and including at least one additional fuel rod extending from said lower tie plate but terminating short of said upper tie plate, the improvement comprising an extension rod secured to said at least one additional fuel rod and extending substantially to said upper tie plate, said extension rod comprising a hollow tube having a plurality of openings therein and a flow path structure within said hollow tube radially adjacent said plurality of openings and extending over an axial portion of the hollow tube, the flow path configured to cause separation of a two phase water/steam coolant such that water droplets in the hollow tube flow outwardly through said openings and onto adjacent fuel rods.

2. The fuel bundle of claim 1 wherein said plurality of openings include diametrically opposed helical windows.

3. The fuel bundle of claim 2 wherein said plurality of openings include ventilation apertures circumferentially spaced about said hollow tube at locations above and below said helical windows.

4. In a fuel bundle for a boiling water nuclear reactor comprising a plurality of fuel rods secured within an array and extending between upper and lower tie plates, and including at least one additional fuel rod extending from said lower tie plate but terminating short of said upper tie plate, the improvement comprising an extension rod secured to said at least one additional fuel rod and extending substantially to said upper tie plate, said extension rod comprising a hollow tube having a plurality of openings therein including diametrically opposed helical windows, and a flow path structure within said hollow tube radially adjacent said diametrically opposed helical windows and extending over an axial portion of the hollow tube, the flow path configured to cause liquid coolant in the hollow tube to flow outwardly through said openings and be deposited on adjacent fuel rods, wherein said helical windows are each formed by a plurality of tabs partially cut from said tube and bent inwardly toward a longitudinal axis of said tube, said tabs forming said flow path structure.

5. In a fuel bundle for a boiling water nuclear reactor comprising a plurality of fuel rods secured within an array and extending between upper and lower tie plates, and including at least one additional fuel rod extending from said lower tie plate but terminating short of said upper tie plate, the improvement comprising an extension rod secured to said at least one additional fuel rod and extending substantially to said upper tie plate, said extension rod comprising a hollow tube having a plurality of openings therein and a flow path structure within said hollow tube radially adjacent said plurality of openings and extending over an axial portion of the hollow tube, the flow path configured to cause liquid coolant in the hollow tube to flow outwardly through said openings and be deposited on adjacent fuel rods, wherein said plurality of openings also include at least one pair of adjacent, axially extending slits at a location corresponding to a fuel bundle spacer.

6. The fuel bundle of claim 5 wherein tube material between said pair of slits is bent radially outwardly.

7. The fuel bundle assembly of claim 4 and including two, axially spaced pairs of adjacent, axially extending slits at locations corresponding to adjacent fuel bundle spacers.

8. The fuel bundle of claim 7 wherein tube material between said pair of slits is bent radially outwardly.

9. The fuel bundle of claim 1 wherein said tube is comprised of Zircaloy.

10. The fuel bundle of claim 4 wherein said tabs impart to said flow path a substantially twisted ribbon shape.

11. A partial length fuel rod extender adapted to be attached to an upper end of a partial length fuel rod of a nuclear reactor fuel bundle comprising a hollow tube having a plurality of openings therein and a flow path structure within said hollow tube radially adjacent said plurality of openings and extending over an axial portion of the hollow tube, said flow path structure shaped to cause two phase water/steam coolant in said hollow tube to separate such that water flows through said plurality of openings and onto adjacent fuel rods.

* * * * *